United States Patent [19]

Gonzales

[11] 4,434,956
[45] Mar. 6, 1984

[54] FLEXIBLE HELICOPTER ROTOR AND PITCH CONTROL MECHANISM

[76] Inventor: Gilbert R. Gonzales, 1314 N. Winstel Blvd., Tucson, Ariz. 85716

[21] Appl. No.: 312,497

[22] Filed: Oct. 19, 1981

[51] Int. Cl.³ .............................................. B64C 27/38
[52] U.S. Cl. ............................... 244/17.25; 244/17.11; 244/6; 244/8; 416/240
[58] Field of Search ................. 244/6, 8, 17.11, 17.25, 244/26, 28, DIG. 1.1, DIG. 1.5; 416/194 R, 196 R, 240 R, 132 R, 132 A; 114/103

[56] References Cited

U.S. PATENT DOCUMENTS

| | | | |
|---|---|---|---|
| 762,273 | 6/1904 | Best | 244/26 |
| 877,529 | 1/1908 | Tkatzschenko | 244/28 |
| 2,620,760 | 12/1952 | Melges | 114/103 |
| 3,188,020 | 6/1965 | Nielsen et al. | 244/17.25 |
| 3,426,982 | 2/1969 | Markwood | 244/17.25 |
| 3,558,082 | 1/1971 | Bennie | 244/17.25 |
| 4,067,515 | 1/1978 | Searle | 244/DIG. 1.1 |

FOREIGN PATENT DOCUMENTS

| | | | |
|---|---|---|---|
| 321685 | 1/1903 | France | 416/132 |
| 939847 | 11/1948 | France | 416/132 A |

Primary Examiner—Trygve M. Blix
Assistant Examiner—Ivy M. Shum
Attorney, Agent, or Firm—Cahill, Sutton & Thomas

[57] ABSTRACT

A flexible helicopter rotor includes a vertical rotor axle, a mechanism for rotating the vertical rotor axle in a first rotational direction, and a plurality of segmented flexible airfoils secured to and extending radially from the vertical rotor axle, each segment of each airfoil forming a billowing, canopy-shaped surface as the vertical rotor axle is rotated. Each airfoil includes a cross spar extending radially from the vertical rotor axle and in turn supporting first and second leading edge spars and first and second keel spars. The forward ends of the leading edge spars and keel spars are joined to form an apex of the airfoil at a point ahead of the cross spar. A flexible membrane is secured to the first and second leading edge spars and to the first and second keel spars and is divided thereby to form the segmented flexible airfoil. The pitch of the plurality of airfoils may be controlled by a swash plate coupled to the inner leading edge spar by a push-pull rod; alternatively, a cable engaging a pair of guides may extend between the swash plate and the apex of the airfoil for controlling the pitch thereof.

13 Claims, 12 Drawing Figures

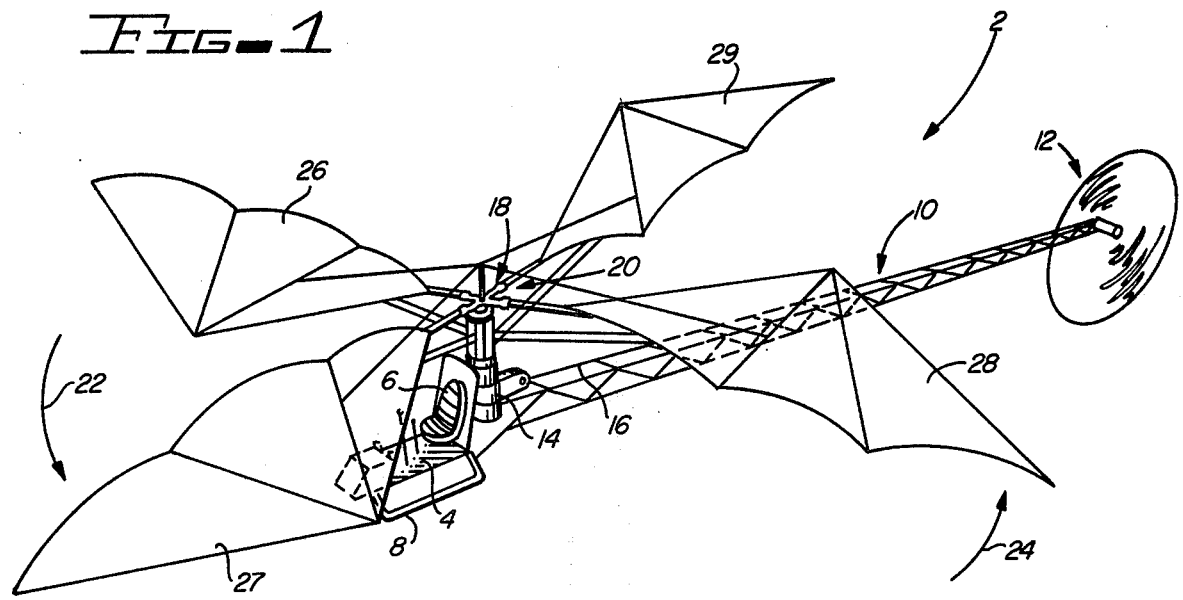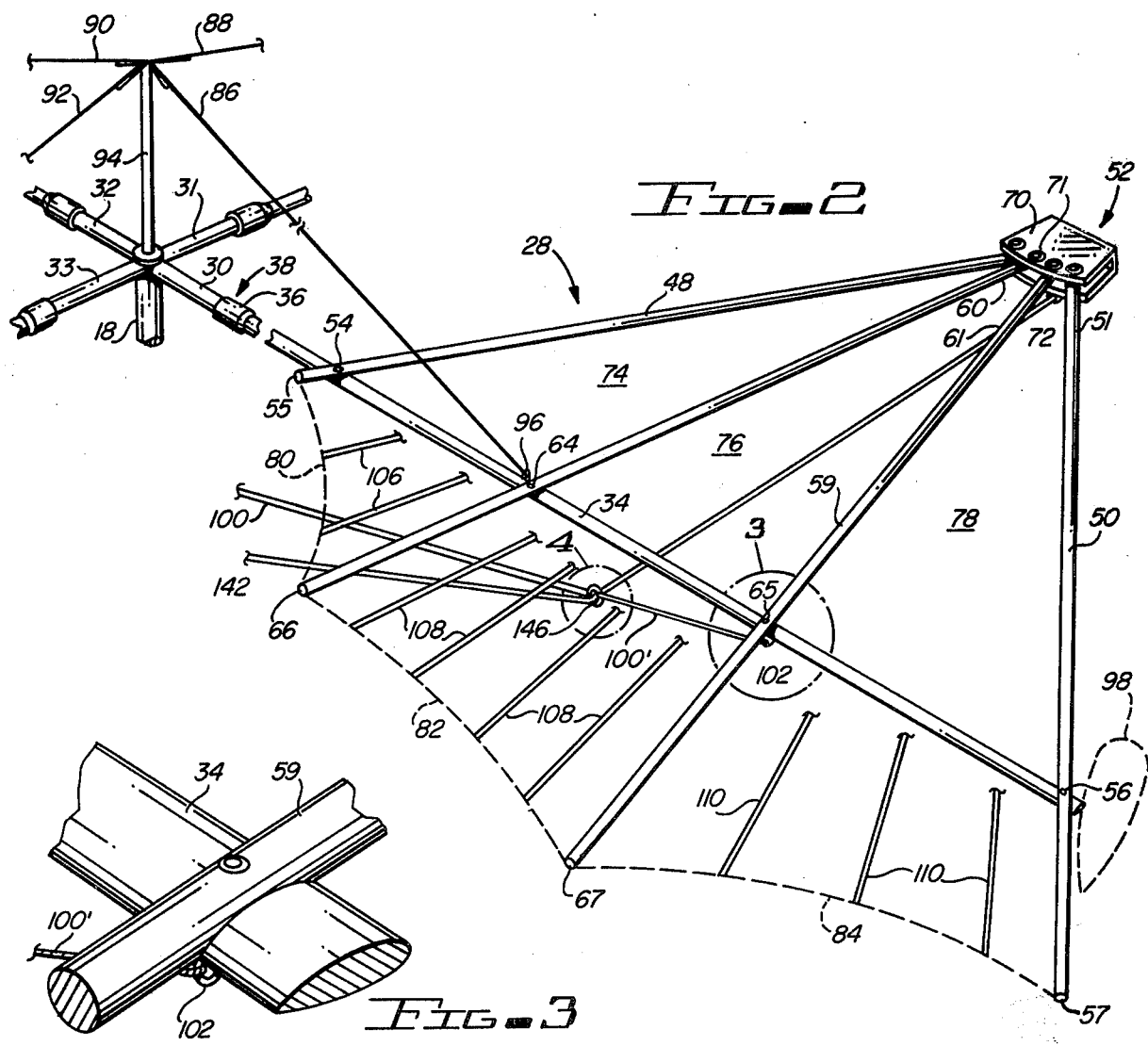

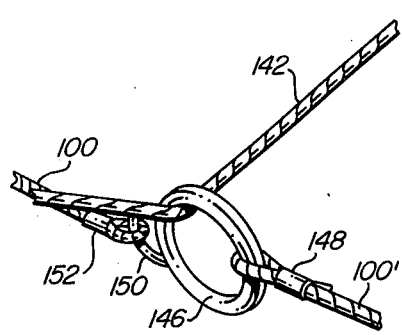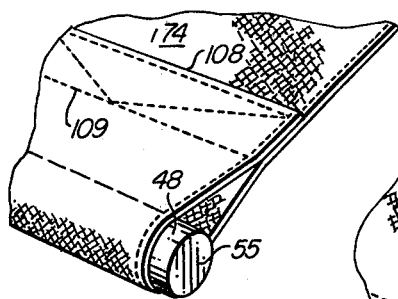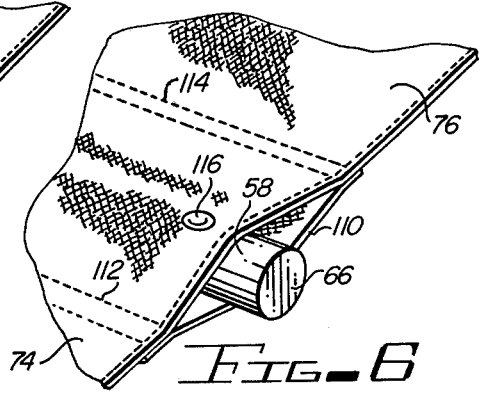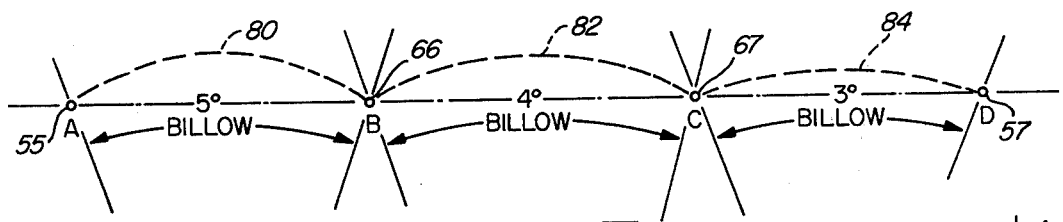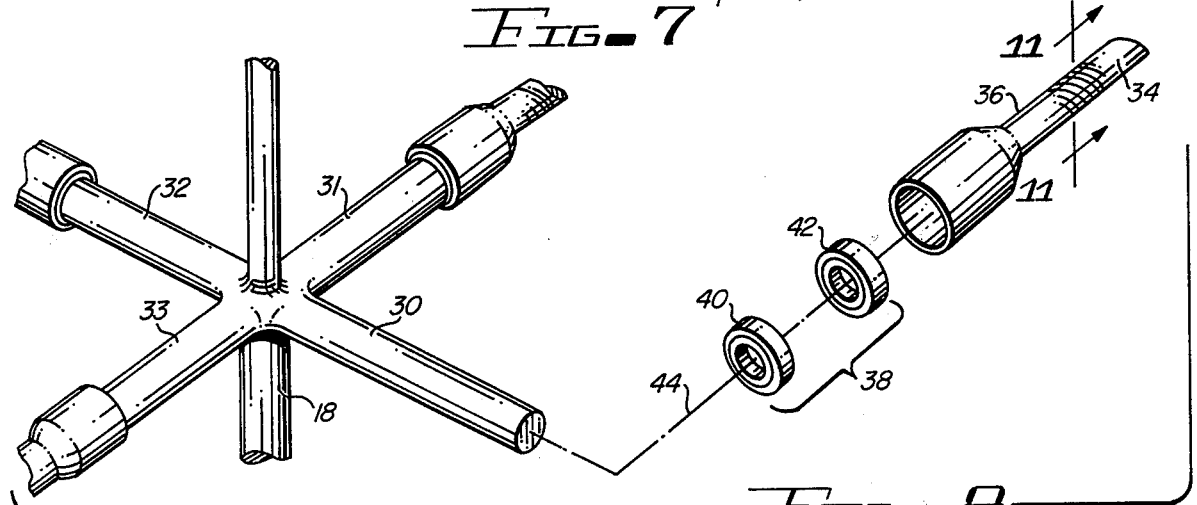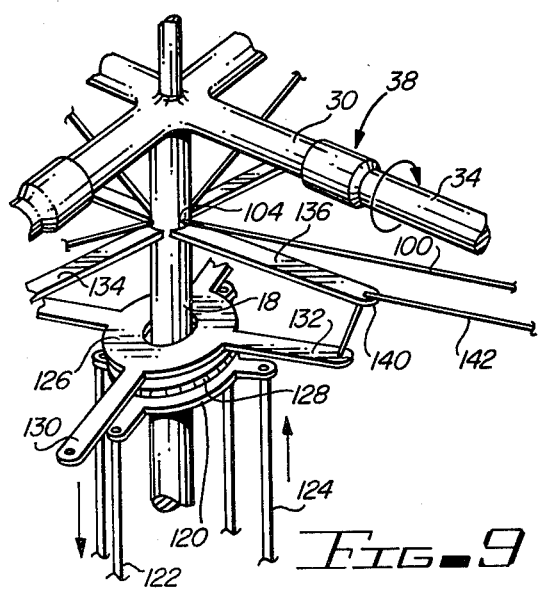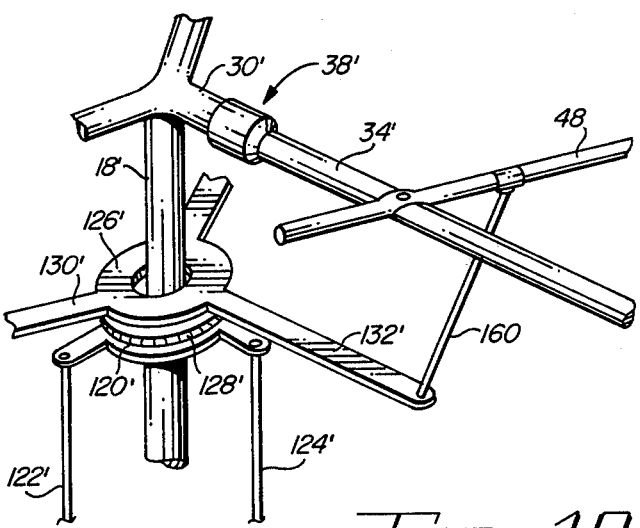

FLEXIBLE HELICOPTER ROTOR AND PITCH CONTROL MECHANISM

BACKGROUND OF THE INVENTION

1. Field of the Invention

The present invention relates generally to aircraft having flexible airfoils, and more particularly, to a helicopter utilizing a plurality of segmented, flexible airfoils in place of conventional rotor blades, and to a pitch control mechanism particularly adapted thereto.

2. Description of the Prior Art Helicopters are widely used in both civilian and military applications wherein vertical take-offs and landings and the capability of hovering are desired. Nonetheless, the design of conventional helicopter rotors often results in undesirable features. For example, conventional rotor assemblies must be rotated relatively rapidly in order to generate sufficient lift to maintain the aircraft aloft. Tip speeds of rotor blades typically reach 85 percent of the speed of sound in air. As a result, helicopters tend to be rather noisy and unsuited for certain military applications wherein such noise puts others on notice of the presence of the helicopter. In addition, should the engine fail while such conventional helicopters are aloft, then a pilot must immediately make critical adjustments to the pitch of the rotor blades in order to attempt a landing via autogyration (autorotation) of the rotor to create lift for slowing the descent. During such an engine-out condition, a pilot may panic and fail to make such adjustments. Moreover, landings made via autogyration may be safely attempted only when the aircraft is approximately 50 feet to 200 feet from the ground; at altitudes of less than 50 feet, even an experienced pilot lacks the time needed to make critical pitch angle adjustments, while at altitudes above 200 feet, the gravitational acceleration of the aircraft far exceeds the lift created by autogyration.

Attempts to utilize a flexible airfoil in place of a rotor blade for a helicopter are known in the art. For example, U.S. Pat. No. 3,597,108 discloses a semi-rigid airfoil for use with a helicopter or the like and including a rigid leading edge spar and a cable defining a trailing edge while a flexible material extends between the leading and trailing edges to form the airfoil surface. Similarly, U.S. Pat. No. 3,188,020 discloses a helicopter having flexible rotor blades, each of which includes a pair of flexible cables forming leading and trailing edges of the blade and including a flexible membrane stretched therebetween. Analytical studies of such a flexible blade are reported in "An Investigation Of Extremely Flexible Lifting Rotors", by Winston, N.A.S.A. Technical Note D-4465, April, 1968, and "A Hovering Investigation Of An Extremely Flexible Lifting Rotor", by Winston, N.A.S.A. Technical Note D-4820, October, 1968.

Though such prior art flexible rotor blades serve to reduce the weight of the aircraft, these prior art flexible rotors must nonetheless be rotated at relatively high rates in order to develop sufficient lifting forces to allow the aircraft to take off and hover. Moreover, it is believed that the prior art has failed to teach a simple and reliable mechanism for varying the collective and/or cyclic pitch of such flexible rotor blades.

Non-rotational flexible airfoils are also known in the art for use with slow flight, non-hovering aircraft, such as kites, hang gliders, and ultra-light powered aircraft. One such slow flight wing has a generally triangular shape and completely flexible trailing edges; such prior slow flight wings are known as delta wings, parasol wings, and rogallo wings. Prior art references disclosing such airfoils include U.S. Pat. Nos. 2,546,078; 3,141,640; 3,194,514; 3,250,500; 3,361,388; 3,830,449; and Des. 224,248. Additional details concerning such airfoils are described in "The Complete Outfitting And Source Book for Hang Gliding", Library of Congress No. TL 766 M46. The aforementioned slow flight airfoils are generally symmetrical and include one or more flexible billowing segments for creating lift upon translational movement. Such symmetrically shaped airfoils are not adapted for use with rotary winged vehicles as the speed of each portion of the rotary wing varies depending upon its distance from the rotor axle.

Accordingly, it is an object of the present invention to provide a flexible helicopter rotor adapted to be rotated at relatively low speeds and providing a significantly quieter operation than helicopter rotors of the type already known to the art.

It is another object of the present invention to provide a flexible helicopter rotor adapted for an ultra-light rotary wing aircraft.

It is still another object of the present invention to provide a flexible helicopter rotor which may be safely autogyrated from any altitude.

It is a further object of the present invention to provide a flexible helicopter rotor which slows the descent of an aircraft by parachuting during non-autogyrating operation.

It is a still further object of the present invention to provide such a flexible helicopter rotor including a relaively simple and lightweight pitch change control mechanism for varying the collective and cyclic pitch of the flexible airfoils within such a rotor.

These and other objects of the present invention will become apparent to those skilled in the art as the description thereof proceeds.

SUMMARY OF THE INVENTION

Briefly described, and in accordance with one embodiment thereof, the present invention relates to a flexible helicopter rotor including a vertical rotor axle, a motor for rotating the vertical rotor axle in a first rotational direction, and a plurality of relatively slow flight flexible, billowing airfoils each including one or more canopy-shaped segments. The flexible helicopter rotor preferably also inludes a pitch change mechanism for allowing both the collective and cyclic pitch of the plurality of airfoils to be varied.

Each airfoil preferably includes a cross spar extending radially from the vertical rotor axle and first and second leading edge spars secured to the cross spar, the first and second leading edge spars each having front ends which intersect one another to form an apex of the airfoil at a point ahead of the cross spar relative to the first rotational direction. A flexible membrane is secured to and extends between the first and second leading edge spars to form at least one billowing canopy-shaped surface. One or more keel spars may extend rearwardly from the apex of the airfoil between the first and second leading edge spars for subdividing the flexible membrane into a plurality of segments each of which forms a billowing canopy-shaped surface. The planform and extent of billowing for each of the plurality of segments varies from segment to segment to account for differences in the speed of each segment in accordance with its distance from the vertical rotor axle. Excessive flap due to the lift created by each of the airfoils is prevented by providing a wing tip mass at the outermost tip of each airfoil for developing a centrifugal force which tends to maintain each airfoil generally horizontal and/or by securing support cables between each cross spar and the lower portion of the vertical rotor axle.

Each cross spar is preferably secured to the vertical rotor axle by a pitch change bearing for allowing the cross spar to rotate about its longitudinal axis. In one embodiment of the present invention, the pitch or angle of attack for each of the airfoils is controlled by a swash plate mounted concentrically with the vertical rotor axle for rotation therewith, the swash plate being coupled to each of the airfoils by a push-pull rod extending from the swash plate to the inner leading edge spar. In an alternate embodiment of the present invention, the swash plate is coupled to the nose portion of each airfoil by a pitch control cable extending over first and second guide surfaces for converting generally vertical movement of the swash plate to rotational movement of the airfoil about the longitudinal axis of the cross spar. The guide surface located closest to the nose of the airfoil may advantageously be incorporated within a lower support cable extending from the lower portion of the vertical rotor axle to the cross spar for the purpose of preventing upward flap of the airfoil.

BRIEF DESCRIPTION OF THE DRAWINGS

FIG. 1 is a perspective view of an ultra-light helicopter utilizing a plurality of slow flight, segmented flexible airfoils each forming a plurality of billowing, canopy-shaped surfaces.

FIG. 2 is a perspective view of a segmented, flexible airfoil and illustrating upper support cables for helping to support the airfoil when at rest, a lower support cable for preventing upward flapping movement of the airfoil, and a pitch control cable for controlling the pitch of the airfoil.

FIG. 3 is a more detailed partial perspective view of the portion of FIG. 2 circled by dashed lines 3 and illustrates the contour of the cross spar as well as the manner in which a keel spar is joined thereto.

FIG. 4 is a more detailed partial perspective view of the portion of FIG. 2 circled by dashed lines 4 and illustrates the manner in which a lower support cable may incorporate a guide surface for guiding the pitch control cable.

FIG. 5 is a partial perspective view showing the manner in which a flexible membrane is secured to a leading edge spar of the airfoil.

FIG. 6 is a partial perspective view illustrating the manner in which the flexible mambrane is secured to one of the keel spars.

FIG. 7 is an end view of the airfoil shown in FIG. 2 and shows, by exaggeration for purposes of illustration, the degree of billowing for each of the three canopy-shaped segments of the airfoil.

FIG. 8 is an exploded perspective view of the vertical rotor axle and the pitch change bearing used to rotatably couple each cross spar thereto.

FIG. 9 is a perspective view illustrating a pitch control swash plate coupled by a pitch control cable to each of the plurality of airfoils.

FIG. 10 is a perspective view of a pitch control swash plate coupled to each airfoil by vertically extending push-pull rods secured to the inner leading edge spar of each airfoil.

DETAILED DESCRIPTION OF THE PREFERRED EMBODIMENT

Figure 11:
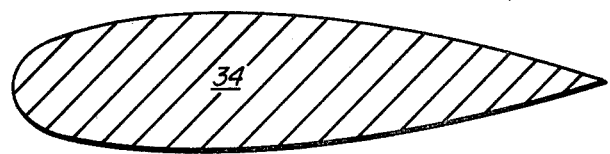
FIG. 11 is a cross-sectional view of a cross spar taken through lines 11—11 as shown in FIG. 8.

Shown in FIG. 1 is an ultra-light helicopter, designated generally by reference numeral 2, incorporating a plurality of slow flight, segmented, flexible airfoils according to the teachings of the present invention. Helicopter 2 includes a forward body 4 including a pilot's seat 6 and controls used by the pilot to operate the helicopter. Forward body portion 4 includes an undercarriage 8 illustrated in the form of a skid but which may also consist of wheels, floats, or the like. Forward body 4 is secured to the front end of a rearwardly extending fuselage 10. A conventional tail rotor assembly 12 is disposed at the rear end of fuselage 10. An engine 14 and associated gear box are mounted to fuselage 10 immediately behind forward body portion 4. Drive shaft 16 extends rearwardly from the gear box to power tail rotor 12. Rotor axle 18 extends vertically upward from engine 14 and its associated gear box for rotating rotor assembly 20 in a first rotational direction designated by arrows 22 and 24. As shown in FIG. 1, rotor assembly 20 includes a plurality of flexible, segmented airfoils 26, 27, 28 and 29 extending radially from vertical rotor axle 18.

Referring now to FIG. 2, airfoil 28 is shown in greater detail. The flexible membrane which forms the airfoil is outlined in FIG. 2 by dashed lines to simplify the drawing and to reveal the details of the framework used to support the flexible membrane. As shown in FIG. 2, a plurality of horizontally disposed struts 30, 31, 32 and 33 extend radially from vertical rotor axle 18 for securing each of the plurality of airfoils thereto. Airfoil 28 includes a cross spar or cross tube 34 secured to and extending axially from strut 30. The portion of cross spar 34 closest to vertical rotor axle 18 forms a dog bone 36 for housing a pitch change bearing assembly 38. Referring briefly to FIG. 8, pitch change bearing assembly 38 includes an inner race 40 rigidly secured to the end of strut 30 as well as an outer race 42 rigidly secured to dog bone 36 of cross spar 34. Inner race 40 is secured within outer race 42 for coupling cross spar 34 to strut 30 while allowing cross spar 34 to rotate about its longitudinal axis 44. As shown in FIGS. 3 and 11, cross spar 34 preferably has a cross-sectional contour in the shape of an airfoil for reducing drag associated therewith.

Still referring to FIG. 2, airfoil 28 includes a first (or inner) leading edge spar 48 and a second (or outer) leading edge spar 50. First and second leading edge spars 48 and 50 each include a front end joined together at a nose or apex 52 located at a point ahead of cross spar 34 relative to the direction in which airfoil 28 is rotated. Leading edge spars 48 and 50 diverge rearwardly from apex 52 toward cross spar 34 and are secured thereto at points designated 54 and 56, respectively. Securement point 54 is located relatively close to vertical rotor axle 18 and relatively close to rear end 55 of leading edge spar 48. Securement point 56 is located at the outermost tip of cross spar 34 and between front end 51 and rear end 57 of leading edge spar 50.

Also shown in FIG. 2 are first and second keel spars 58 and 59, respectively, which include front end portions 60 and 61, respectively, coupled to apex 52 and extending rearwardly between leading edge spars 48 and 50 in spaced apart relationship. Keel spars 58 and 59 are secured to cross spar 34 at securement points designated 64 and 65, respectively. Securement point 64 is located between front end 60 and rear end 66 of keel spar 58; similarly, securement point 65 is located between front end 61 and rear end 67 of keel spar 59.

As shown in FIG. 2, apex 52 includes a U-shaped nose plate 70 made of stainless steel or aluminum for joining the front ends of leading edge spars 48 and 50 and the front ends of keel spars 58 and 59. Holes are drilled vertically through nose plate 70 and through the front ends of the spars 48, 50, 58 and 59, and bolts, such as 71, are extended through such corresponding holes and are engaged by nuts to secure each of the spars to nose plate 70. An apertured tang 72 extends downwardly from nose plate 70; the function of tang 72 will be described in further detail below.

Cross spar 34, leading edge spars 48 and 50, and keel spars 58 and 59 are preferably made of aluminum or a lightweight metal alloy to reduce the overall weight of the aircraft. In the event that cross spar 34, leading edge spars 48 and 50, and keel spars 58 and 59 are constructed from hollow tubing, then points of attachment between such spars may be made by simply overlying one spar upon the other and drilling a hole vertically through both spars for receiving a retaining bolt and nut. Plastic standoff saddles may be inserted between the adjacent spars to avoid deformation of the tubing. On the other hand, if such spars are made of solid members rather than hollow tubing, then interlocking channels may be formed within such spars to facilitate connection therebetween. Referring briefly to FIG. 3, cross spar 34 and keel spar 59 are shown as being channeled for interlockingly receiving one another at their point of attachment.

Still referring to FIG. 2, a flexible membrane is secured to and extends between leading edge spar 48, keel spar 58, keel spar 59, and leading edge spar 50 to form a segmented flexible billowing-type airfoil. Keel spars 58 and 59 divide the flexible membrane into a first segment 74, a second segment 76, and a third segment 78. The flexible trailing edges of segments 74, 76 and 78 are designated in FIG. 2 by reference numerals 80, 82 and 84, respectively. Each of membrane segments 74, 76 and 78 forms a billowing, canopy-shaped surface upon rotation of airfoil 28 in the direction indicated in FIG. 1. The material used to form such membrane segments may be of any flexible material, for example rip stop rayon or nylon fabric.

Figure 12:
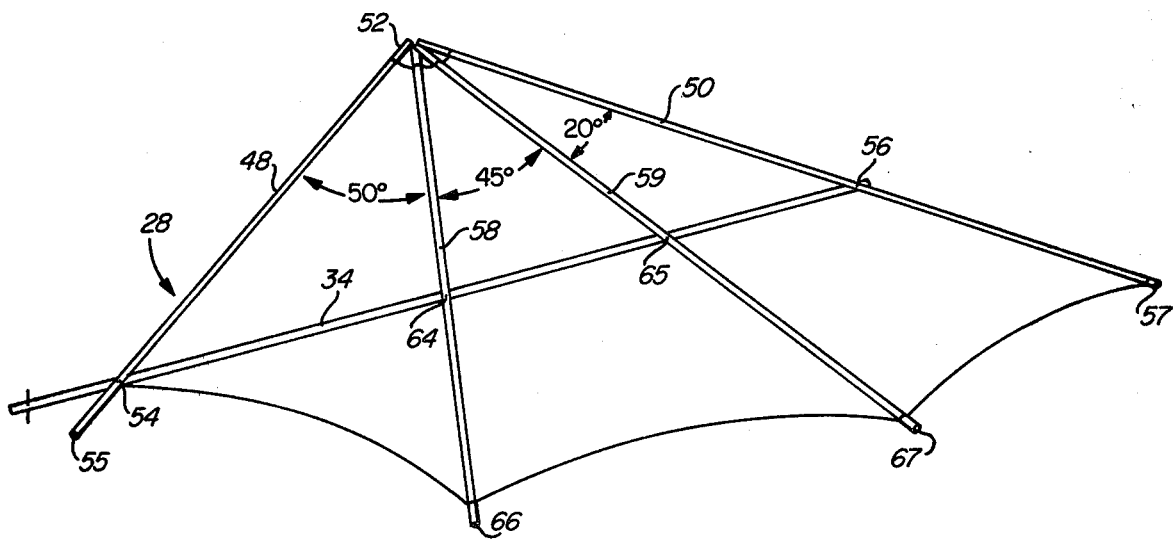
FIG. 12 is a top view (planform view) of an airfoil.

Referring briefly to FIG. 12, a particularly advantageous planform is illustrated for airfoil 28. As shown in FIG. 12, leading edge spar 48 and keel spar 58 are of approximately equal length and diverge from one another at an angle of approximately 50 degrees. Leading edge spar 48 is secured to cross spar 34 at the rearmost end of leading edge spar 48, while keel spar 58 is secured to cross spar 34 slightly behind the center point of keel spar 58. Keel spar 59 is approximately one-third longer than keel spar 58 and forms an angle of approximately 45 degrees therewith. Keel spar 59 is secured to cross spar 34 at approximately the midpoint of keel spar 59. Finally, leading edge spar 50 is approximately 25 percent longer than keel spar 59 and forms an angle of approximately 20 degrees therewith. Leading edge spar 50 is secured to cross spar 34 at a point approximately three-fifths of its total length from the front end thereof. Accordingly, the ratio of the lengths of spars 48, 58, 59 and 50 are approximately 3:3:4:5, and the overall angle between leading edge spars 48 and 50 is approximately 115 degrees.

Referring now to FIG. 7, the amount of billowing allowed for segments 74, 76 and 78 is illustrated by showing end views of trailing edge portions 80, 82 and 84, respectively. As is well known to those skilled in the art, billow refers to the upward curve of a flexible lifting surface when filled with air. As shown in FIG. 7, the amount of billowing allowed for membrane segments 74, 76 and 78 is approximately 5 degrees 4 degrees and 3 degrees, respectively, in the preferred embodiment of airfoil 28. The angles shown within FIG. 7 have been exaggerated to render more apparent the relative amounts of billowing allowed as between one segment and another and to illustrate that the amount of billowing is decreased as a particular segment is located more distantly from the vertical rotor axle 18.

The flexible segment planforms and amounts of billowing described above provide an asymmetrical airfoil adapted to varying wing speeds as determined by the distance of each portion of the rotary wing from the vertical rotor axle. The resulting flexible rotor provides significant amounts of lift at relatively low rotational speeds.

Referring again to FIG. 2, a plurality of ground wires or upper elongated support members 86, 88, 90 and 92 are illustrated for helping to support airfoils 28, 29, 26 and 27, respectively, when vertical rotor axle 18 is at rest or is rotating at a very low rate of speed. King post 94 extends vertically upward from rotor axle 18 for engaging the upper ends of ground wires 86–92. The lower end of ground wire 86 is secured to an apertured tang or eye bolt 96 extending upwardly from keel spar 58 at securement point 64.

Still referring to FIG. 2, airfoil 28 may optionally include a wing tip mass, represented by dashed lines 98 at the outermost tip of cross spar 34 for the purpose of restricting upward flapping movement of airfoil 28. As is known to those skilled in the art, rotational movement of airfoil 28 creates an upward force or lift which tends to raise airfoil 28 at an angle with respect to a horizontal plane. Wing tip mass 98 develops an outward centrifugal force having a magnitude which increases as rotational speed is increased for helping to maintain airfoil 28 in a nearly horizontal plane.

In addition to, or in substitution for, wing tip mass 98, a lower support cable 100 may be used to restrict upward flapping movement of airfoil 28. As shown in FIG. 2, the portion of support cable 100 furthest from vertical rotor axle 18, or portion 100', is secured to an apertured tang or eye bolt 102 extending downwardly from cross spar 34 below securement point 65. The end of support cable 100 opposite portion 100' is secured to vertical rotor axle 18 at point 104 located below the point at which strut 30 extends radially from vertical rotor axle 18, as shown in FIG. 9. As vertical rotor axle 18 is rotated and airfoil 28 begins to provide lift, tension in support cable 100 increases for restricting upward flapping movement of airfoil 28.

As is known to those skilled in the art, flexible airfoils may be subject to luffing, or the loss of billow within the flexible membrane; luffing usually results in a fluttering of the airfoil and a resulting loss of lift. To minimize such luffing, batten rods, designated in FIG. 2 by reference numerals 106, 108, and 110, may be inserted within the flexible membrane adjacent the trailing edges of segments 74, 76 and 78 thereof and extending generally toward apex 52 of the airfoil. Such batten rods may be secured to the flexible membrane segments by sewing additional swatches of fabric to the flexible membrane segments to form pockets for receiving the batten rods.

FIG. 5 illustrates the manner in which flexible membrane segment 74 is secured to leading edge spar 48. As is shown in FIG. 5, the inner edge 108 of membrane segment 74 is wrapped under leading edge spar 48 and overlies the upper surface of membrane segment 74. Edge portion 108 is then secured, as by stitching 109, to the portion of membrane segment 74 which it overlies to form a pocket wrapped about leading edge spar 48. As shown in FIG. 5, rear end 55 of leading edge spar 48 may protrude from the aforementioned pocket.

Similarly, FIG. 6 illustrates the manner in which adjacent edges of flexible membrane segment 74 and 76 are secured to keel spar 58. An elongated panel of flexible material 110 is disposed below keel spar 58 and is stitched to the underside of flexible membranes 74 and 76, as by stitching 112 and 114, on either side of keel spar 58 for the entire length thereof. In addition, a rivet 116 or other fastener is preferably inserted through the flexible membrane forming segments 74 and 76, through keel spar 58, and through elongated panel 110 for positively securing the flexible membrane to keel spar 58.

Helicopter rotors are typically constructed to incorporate a mechanism for adjusting the angle of attack and pitch of each of the rotor blades, both to facilitate the creation of lift and to allow for translational flight. Changes in collective pitch cause each of the rotor blades to change pitch equally and in the same direction. Collective pitch is changed for several reasons, including adjusting the amount of lift provided at a given rotor speed, compensating for changes in air density at varying altitudes, and to compensate for changes in the angle of attack due to movement of the aircraft in translational flight. In contrast, cyclic pitch changes cause the pitch of each rotor blade to be altered continuously from a minimum to a maximum during each revolution of the rotor. As the amount of pitch of a given rotor blade increases, it creates more lift. Through proper control of cyclic pitch, translational motion may be imparted to the aircraft. For further details concerning the manner in which cyclic pitch is used to create translational flight, see "The Helicopter And How It Flies", by J. Fay, Library of Congress No. TL716F35 (1976). The mechanism most commonly used to control both collective and cyclic pitch is a swash plate system including a lower, non-rotating swash plate and an upper rotating swash plate. Each swash plate is mounted concentrically with the vertical rotor axle and the upper and lower swash plates are coupled to one another by a bearing.

FIGS. 9 and 10 illustrate two alternative embodiments of the present invention using such a swash plate system for controlling collective and cyclic pitch of the flexible, segmented airfoils. In FIG. 9, the swash plate system includes a lower swash plate 120 supported by a plurality of push-pull rods including those designated 122 and 124. Lower swash plate 120 is coupled to an upper swash plate 126 by bearing assembly 128. Upper swash plate 126 includes a plurality of radially extending fingers, including those designated 130 and 132, equal in number to the number of airfoils. As mentioned above, upper swash plate 126 is concentric with and rotates with vertical rotor axle 18.

A plurality of guide members, including those designated 134 and 136, equal in number to the number of airfoils, extend radially from vertical rotor axle 18 directly above swash plate 126. Each guide member includes a guide surface, such as aperture 140 within guide member 136, at the outermost tip thereof for being engaged by a pitch control cable 142. A first end of pitch control cable 142 is secured to the outermost tip of swash plate finger 132. From guide surface 140, pitch control cable 142 extends toward airfoil 28 (see FIG. 2). Thus, up/down movement of swash plate finger 132 is converted by guide member 136 to lateral movement of that portion of pitch control cable 142 which extends toward airfoil 28. A second guide surface is provided below cross spar 34 and behind apex 52 for being engaged by pitch control cable 142, and for converting lateral movement of that portion of pitch control cable 142 which extends between the first and second guide surfaces into a motion for raising or lowering apex 52, and thereby rotating airfoil 28 about pitch change bearing assembly 38 for changing the pitch thereof.

As shown in FIGS. 2 and 4, the second guide surface may advantageously be provided by interposing within support cable 100, 100' a ring 146, a pulley, or other surface which facilitates sliding movement of pitch control cable 142. As shown more clearly in FIG. 4, the end of support cable portion 100' secured to ring 146 may be looped therethrough and retained by a Nico press fastener 148 or the like. Pitch control cable 142 is inserted through ring 146 to facilitate sliding movement thereof. Joined to ring 146 is a smaller apertured member 150 for receiving the looped end of support cable 100 which may be retained thereto by a similar Nico press fastener 152.

Those skilled in the art will appreciate that as swash plate finger 132 is lowered, that portion of pitch control cable 142 extending between guide sufaces 140 and 146 will be moved toward vertical rotor axle 18; accordingly, the length of pitch control cable 142 extending between guide ring 146 and tang 72 of apex 52 will be decreased, causing apex 52 of airfoil 28 to rotate downwardly, corresponding to a smaller pitch angle. Similarly, if swash plate finger 132 is subsequently raised, the length of pitch control cable 142 extending between ring 146 and tang 72 is increased, thereby allowing apex 52 to rotate upwardly for increased pitch. Thus, support cable 100, 100' and ring 146 not only serve to restrict upward flap of airfoil 28 but also serve as a guiding surface for converting motion of swash plate 126 into motion of the pitch control cable which creates a force that changes the pitch or angle of attack of airfoil 28.

Referring briefly to FIG. 10, an alternative pitch control mechanism is disclosed wherein like components are designated by primed reference numerals. Rather than using a pitch control cable, the pitch control mechanism shown in FIG. 10 utilizes a push-pull rod 160 extending upwardly from the outermost portion of swash plate finger 132' to a point on inner leading edge spar 48 located ahead of cross spar 34'. Accordingly, upward movement of swash plate finger 132' causes the apex of airfoil 28 to rotate upwardly about pitch change bearing 38' for increasing the pitch thereof. Similarly, downward movement of swash plate finger 132' forces the apex of airfoil 28 to rotate downwardly for decreasing the pitch thereof.

Those skilled in the art will now appreciate that a flexible helicopter rotor which may be operated at relatively slow rotational speeds has been described. Apparatus for varying the collective and cyclic pitch of the plurality of flexible, segmented airfoils within such a rotor has also been described. Due to the relatively large amounts of lift created by billowing, canopy-shaped flexible membrane segments, the flexible helicopter rotor may be autogyrated from almost any altitude. Moreover, even were the rotor to become locked against rotation, the billowing airfoils allow the aircraft to safely parachute to a landing. By operating the flexible helicopter rotor at low rotational speeds, operation is maintained relatively quiet and landings may be made safer, softer, and slower.

While the invention has been described with reference to a preferred embodiment thereof, the description is for illustrative purposes only and is not to be construed as limiting the scope of the invention. Various modifications and changes may be made by those skilled in the art without departing from the true spirit and scope of the invention as defined by the appended claims.

I claim:

1. A flexible helicopter rotor comprising in combination:
   a. a vertical rotor axle;
   b. means for rotating said vertical rotor axle in a first rotational direction; and
   c. a plurality of flexible airfoils secured to and extending radially from said vertical rotor axle, each of said airfoils including a plurality of segments, each of said segments having a trailing edge relative to said first rotational direction, the trailing edge of each of said segments being capable of billowing upward to form an arc for allowing each segment of said airfoils to form a billowing, canopy-shaped surface as said vertical rotor axle is rotated in said first rotational direction, the amount by which any particular segment of an airfoil is allowed to billow being less than the amount by which segments located closer to said vertical rotor axle are allowed to billow.

2. A flexible helicopter rotor as recited in claim 1 further comprising a plurality of elongated lower support means each having first and second ends, each of said lower support means having its first end secured to one of said plurality of airfoils and having its second end coupled to said vertical rotor axle at a point disposed below the point at which said airfoil is secured for limiting upward flapping movement of said airfoil due to lift created by said airfoil.

3. A flexible helicopter rotor as recited by claim 1 further comprising a plurality of elongated upper support means each having first and second ends, each of said upper support means having its first end secured to one of said plurality of airfoils and having its second end coupled to said vertical rotor axle at a point disposed above the point at which said airfoil is secured thereto for limiting downward drooping movement of said airfoil when said vertical rotor axle is being rotated at below a predetermined rotational speed.

4. A flexible helicopter rotor comprising in combination:
   a. a vertical rotor axle;
   b. means for rotating said vertical rotor axle in a first rotational direction;
   c. a plurality of flexible airfoils, each of said airfoils including:
      i. a cross spar secured to said vertical rotor axle and extending radially therefrom;
      ii. first and second leading edge spars each having a forward end, the forward ends of said first and second leading edge spars being coupled to one another to form an apex of said airfoil at a point ahead of said cross spar relative to said first rotational direction, said first leading edge spar being coupled to said cross spar at a point relatively close to said vertical rotor axle and said second leading edge spar being coupled to said cross spar proximate the outermost tip thereof;
      iii. a keel spar having a forward end coupled to said apex, said keel spar extending between said first and second leading edge spars and being coupled to said cross spar; and
      iv. a flexible membrane secured to and extending between said first and second leading edge spars, said flexible membrane also being secured to said keel spar and being divided thereby into a first segment bounded by said first leading edge spar and said keel spar and a second segment bounded by said second leading edge spar and said keel spar, each of said first and second segments forming a billowing, canopy-shaped surface as said vertical rotor axle is rotated in said first rotational direction, the amount by which said second segment is allowed to billow being less than the amount by which said first segment is allowed to billow.

5. A flexible helicopter rotor comprising in combination:
   a. a vertical rotor axle;
   b. means for rotating said vertical rotor axle in a first rotational direction;
   c. a plurality of flexible airfoils, each of said airfoils including:
      i. a cross spar secured to said vertical rotor axle and extending radially therefrom;
      ii. first and second leading edge spars each having a forward end, the forward ends of said first and second leading edge spars being coupled to one another to form an apex of said airfoil at a point ahead of said cross spar relative to said first rotational direction, said first leading edge spar being coupled to said cross spar at a point relatively close to said vertical rotor axle and said second leading edge spar being coupled to said cross spar proximate the outermost tip thereof;
      iii. a plurality of keel spars, each of said keel spars having a forward end coupled to said apex, said plurality of keel spars extending rearwardly from said apex in spaced apart relationship between said first and second leading edge spars, each of said keel spars being coupled to said cross spar; and
      iv. a flexible membrane secured to and extending between said first and second leading edge spars, said flexible membrane being secured to each of said keel spars and being divided thereby into a plurality of flexible segments each forming a billowing, canopy-shaped surface as said vertical rotor axle is rotated in said first rotational direction, the amount by which any particular one of said plurality of segments is allowed to billow being less than the amount by which segments disposed closer to said vertical rotor axle than said particular segment are allowed to billow.

6. a flexible helicopter rotor comprising in combination:
   a. a vertical rotor axle;
   b. means for rotating said vertical rotor axle in a first rotational direction;

c. a plurality of flexible airfoils, each of said airfoils including:
  i. a cross spar secured to said vertical rotor axle and extending radially therefrom;
  ii. first and second leading edge spars each having a forward end, the forward ends of said first and second leading edge spars being coupled to one another to form an apex of said airfoil at a point ahead of said cross spar relative to said first rotational direction, said first leading edge spar being coupled to said cross spar at a point relatively close to said vertical rotor axle and said second leading edge spar being coupled to said cross spar proximate the outermost tip thereof;
  iii. a plurality of keel spars, each of said keel spars having a forward end coupled to said apex, said plurality of keel spars extending rearwardly from said apex in spaced apart relationship between said first and second leading edge spars, each of said keel spars being coupled to said cross spar; and
  iv. a flexible membrane secured to and extending between said first and second leading edge spars, said flexible membrane being secured to each of said keel spars and being divided thereby into a plurality of flexible segments each forming a billowing, canopy-shaped surface as said vertical rotor axle is rotated in said first rotational direction;
  v. said plurality of keel spars including first and second keel spars, said first keel spar lying between said first leading edge spar and said second keel spar, said first leading edge spar and said first keel spar forming a first angle therebetween, said first and second keel spars forming a second angle therebetween, and said second keel spar and said second leading edge spar forming a third angle therebetween, said first angle being greater than said second angle, and said second angle being greater than said third angle.

7. A flexible helicopter rotor as recited by claim 6 wherein said first angle is approximately 50°, said second angle is approximately 45°, and said third angle is approximately 20°.

8. A flexible helicopter rotor as recited by claim 6 wherein said second leading edge spar is longer than said second keel spar, and wherein said second keel spar is longer than both said first leading edge spar and said first keel spar.

9. A flexible helicopter rotor as recited by claims 4 or 5 further comprising a plurality of elongated lower support means each having first and second ends, each of said lower support means having its first end secured to said cross spar of one of said airfoils at a point further from said vertical rotor axle than the point at which said first leading edge spar is coupled to said cross spar, each of said lower support means having its second end coupled to said vertical rotor axle at a point disposed below the point at which said cross spar of said airfoil is secured to said vertical rotor axle, said lower support means limiting upward flapping movement of said airfoil due to lift created thereby.

10. A flexible helicopter rotor as recited by claims 4 or 5 further comprising a plurality of elongated upper support means each having first and second ends, each of said upper support means having its first end coupled to said cross spar of one of said airfoils at a point further from said vertical rotor axle than the point at which said first leading edge spar is coupled to said cross spar, and each upper support means having its second end coupled to said vertical rotor axle at a point disposed above the point at which said cross spar is secured, said plurality of upper support means serving to limit downward droop of said plurality of airfoils when said vertical rotor axle is being rotated at below a predetermined rotational speed.

11. A flexible helicopter rotor comprising in combination:
  a. a vertical rotor axle;
  b. means for rotating said vertical rotor axle in a first rotational direction;
  c. a plurality of flexible airfoils, each of said airfoils including:
    i. a cross spar secured to said vertical rotor axle and extending radially therefrom;
    ii. first and second leading edge spars each having a forward end, the forward ends of said first and second leading edge spars being coupled to one another to form an apex of said airfoil at a point ahead of said across spar relative to said first rotational direction, said first leading edge spar being coupled to said cross spar at a point relatively close to said vertical rotor axle and said second leading edge spar being coupled to said cross spar proximate the outermost tip thereof; and
    iii. a flexible membrane secured to and extending between said first and second leading edge spars, said flexible membrane forming a billowing, canopy-shaped surface as said vertical rotor axle is rotated in said first rotational direction;
  d. pitch change bearing means for coupling each of said cross spars to said vertical rotor axle, said pitch change bearing means allowing each of said cross spars to rotate about the longitudinal axis thereof for varying the pitch of each of said airfoils; and
  e. pitch control means coupled to said plurality of airfoils for controlling the pitch of each of said airfoils, said pitch control means including:
    i. a first guide supported below each cross spar of each of said airfoils, said first guide being located further from said vertical rotor axle than the point at which said first leading edge spar is secured to said cross spar;
    ii. a pitch control cable having first and second ends, said first end being secured to said airfoil at a point ahead of said cross spar, said pitch control cable engaging said first guide and including a first portion extending from said first guide to the first end of said pitch control cable, said pitch control cable including a second portion extending from said first guide generally toward said vertical rotor axle;
    iii. cable control means coupled to the second end of said pitch control cable for selectively moving the second portion of said pitch control cable in a substantially radial direction relative to said vertical rotor axle; and
    iv. said first guide converting radial movement of the second portion of said pitch control cable into a corresponding lengthening or shortening of the first portion of said pitch control cable for varying the angular position of said airfoil about the longitudinal axis of said cross spar.

12. A flexible helicopter rotor as recited by claim 11 wherein said pitch control means includes a second guide secured to said vertical rotor axle for engaging said pitch control cable, said second portion of said pitch control cable extending from said first guide to said second guide, and wherein said cable control means includes a swash plate mounted for rotation with and concentric with said vertical rotor axle below said second guide, said swash plate being coupled to the second end of said pitch control cable and moving it in a generally vertical direction, said second guide converting generally vertical movement of the second end of said pitch control cable into generally radial movement of the second portion of said pitch control cable.

13. A flexible helicopter rotor as recited in claim 11 wherein each of said airfoils includes an elongated lower support means having a first end secured to said cross spar at a point remote from said vertical rotor axle and having a second end coupled to said vertical rotor axle at a point disposed below the point at which said cross spar is secured thereto, and wherein said first guide is secured to and supported by said lower support means.

* * * * *